April 4, 1950

E. BOCCHINO 2,502,818

COMBINATION MEAT ROAST RACK
FOR IN AND OUTDOOR USE
Filed Dec. 19, 1947

INVENTOR.
Ernest Bocchino
BY Henry J. Metzler
Agt.

Patented Apr. 4, 1950

2,502,818

UNITED STATES PATENT OFFICE 2,502,818

COMBINATION MEAT ROAST RACK FOR IN- AND OUTDOOR USE

Ernest Bocchino, Clifton, N. J.

Application December 19, 1947, Serial No. 792,659

1 Claim. (Cl. 99—393)

The present invention relates to improvements in devices for facilitating the preparation of rough meat, fish and other food items for human consumption by the application of heat and, more specifically, it relates to an improvement in combination meat roast racks for in and out-door use of the type disclosed in my Patent No. 2,421,922.

One object of the present invention is the provision of a device of the character described which is adapted for being used on an open fire indoors as well as outdoors and also in a broiler or other vessel which is heated electrically or otherwise from a source of heat arranged above the roast rack or beneath the vessel; the racks being easily adjustable, so that one and the same roast rack can be used in connection with vessels of various depths.

Another object of the present invention is the provision of a device of the character described which is provided with food supporting rollers and with simple, heat-resistant means for rotating the rollers, the latter being connected to one another by means for transmitting the rotattion from one roller to other rollers.

A further object of the present invention is the provision of a device of the character described which is composed partially of a pair of inverted U-shaped members whose upper sections are provided with food supporting members and whose lower sections constitute supporting legs which may be provided with adjustable leg extensions.

Still another object of the present invention is the provision of a device of the character described which is light in weight and collapsible, so that it can be stored in a very small space and transported easily, and which is simple in construction and inexpensive to manufacture, but sturdy, durable and well adapted to withstand the rough usage to which devices of this type frequently are subjected.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

In the accompanying drawings the preferred forms of the invention have been shown.

In said drawings:

Fig. 5 is a top view of a detail; and

Fig. 6 is a fractional side view of the detail of Fig. 5.

Similar reference characters refer to similar parts throughout the several views.

Figure 1:
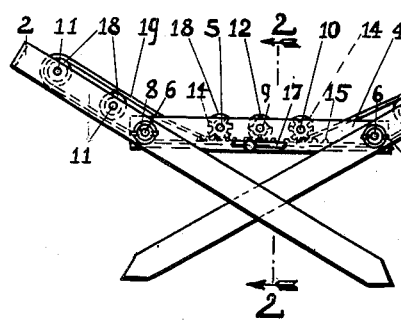
Figure 1 is a side view of a preferred embodiment of my invention as it appears when it is ready for use on an open fire.
Figure 2:
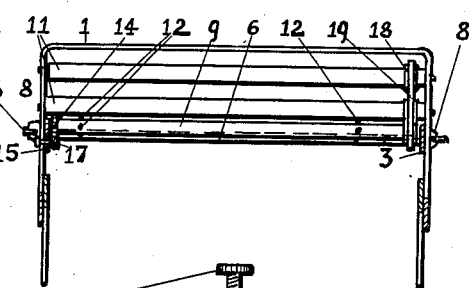
Figure 2 is a sectional view on the line 2—2 of Fig. 1.

In the drawing the numerals 1 and 2 denote a pair of inverted U-shaped members, each of which has a horizontal web portion and a pair of flange portions or flanges. Said flange portions or flanges are pivotally connected to the extremities of a pair of bars 3 and 4 by means of rods 6 which are threaded at their end portions and provided with counter nuts 7 and wing nuts 8. The portions of the flanges of the U-shaped members 1 and 2 which are extended beneath the bars 3 and 4 constitute normally crossed supporting legs whose extremities preferably are pointed as shown.

A plurality of rollers—three rollers 5, 9 and 10 in the instance shown—are rotatably mounted on and extended between the bars 3 and 4, and rollers 11 are likewise rotatably mounted on and extended between those portions of the flanges of the U-shaped members 1 and 2 which extend upwardly beyond the bars 3 and 4. At least one of the rollers, for instance the roller 9 as shown, is provided with pointed prongs 12, and one end portion of the rollers 5, 9 and 10 has secured thereto a gear wheel 14. A toothed rack 15 is in permanent engagement with the wheels 14 and is provided with a handle 16 which extends therefrom laterally through a clot 17 in the bar 4. Thus by shifting the rack 15 on the bar 4, the rollers 5, 9 and 10 can be rotated.

If it is desired to rotate the rollers 11 also, I prefer to provide the latter as well as the rollers 5, 9 and 10 with pulleys 18 and connect them to one another by means of a heat-resistant belt 19. Instead of the pulleys 18 and the belt 19 there could be used sprocket wheels and a chain or any other well-known mechanical means for transmitting the rotating movement from one roller to other rollers.

The extremities of the flanges of the U-shaped members 1 and 2 can be provided with adjustable leg extensions 20, which are shiftable thereon and provided with a set screw 21, as may be seen in Figs. 5 and 6.

Figure 3:
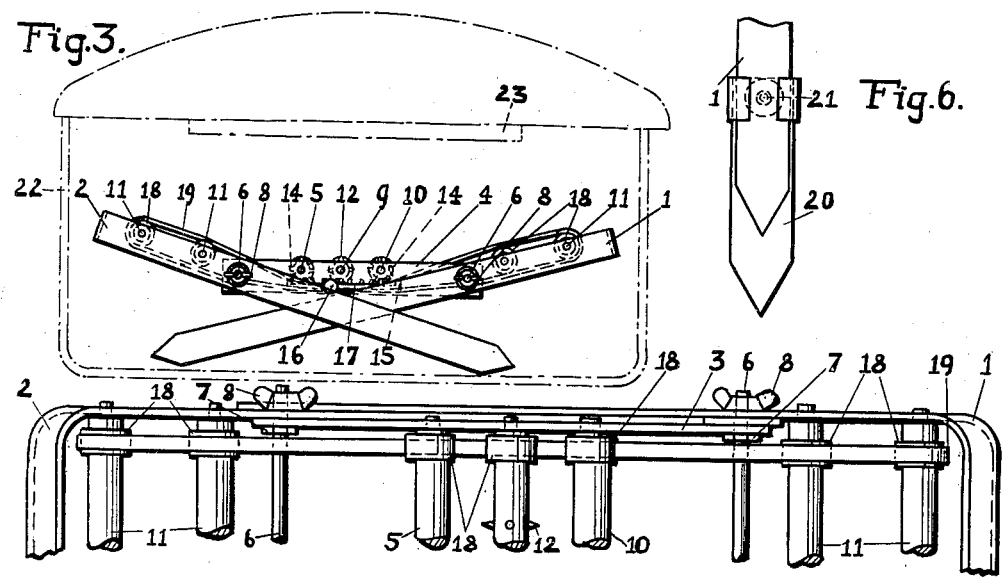
Fig. 3 is a side elevation of the device as it appears when it is used in a broiler.
Figure 4:
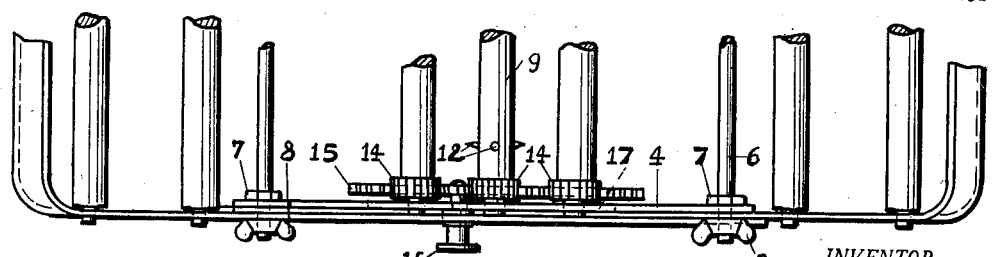
Fig. 4 is an enlarged fractional top plan view.

My new and improved combination meat roast racks for in and out-door use are well adapted for being used on or an open fire indoors as well as outdoors and also in a broiler 22 heated electrically or otherwise from a source of heat arranged above the roast rack as is indicated at 23 in Fig. 3 or beneath the broiler vessel 22. If the device is used in a comparatively shallow vessel, it can be adjusted so that it is primarily flat as shown in Fig. 3.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claim is intended to cover all of the generic and specific features of the invention herein described, and all statements of the scope of the invention which as a matter of language might be said to fall therebetween.

I claim:

A combination meat roast rack comprising a pair of U-shaped members, each of which has a horizontal web and a pair of downwardly inclined flanges which cross the flanges of the other U-shaped member, a pair of bars having their extremities pivotally connected to the center portions of the flanges of said U-shaped members, rollers parallel to the webs of said U-shaped members being rotatably mounted on and extended between said bars and between the flanges of each U-shaped member above the pivot connections of said flanges to said bars, a gear wheel being secured to an end portion of at least one of said rollers, a toothed rack engaging said gear wheel being shiftably attached to one of said bars and provided with a laterally extending handle, the rollers being connected to one another by means for transmitting the rotation from one roller to other rollers, and adjustable leg extensions being shiftably attached to the end portions of said flanges.

ERNEST BOCCHINO.

REFERENCES CITED

The following references are of record in the file of this patent:

UNITED STATES PATENTS

| Number | Name | Date |
|---|---|---|
| 446,855 | Earle | Feb. 24, 1891 |
| 810,824 | Tobey | Jan. 23, 1906 |
| 2,212,207 | Irwin et al. | Aug. 20, 1940 |
| 2,421,922 | Bocchino | June 10, 1947 |